Dec. 17, 1940.  S. JUNGHANS  2,225,414
METHOD OF TREATING MOLTEN SUBSTANCES, SUCH AS METALS
Filed March 31, 1938  3 Sheets-Sheet 1
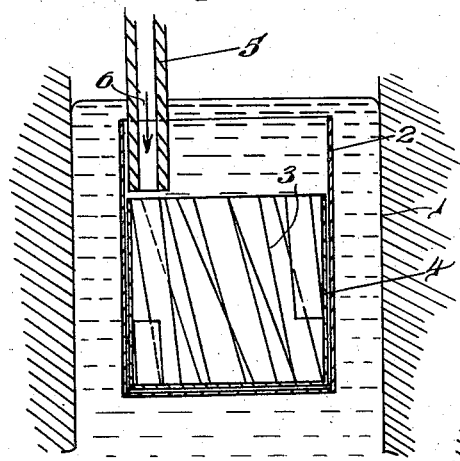
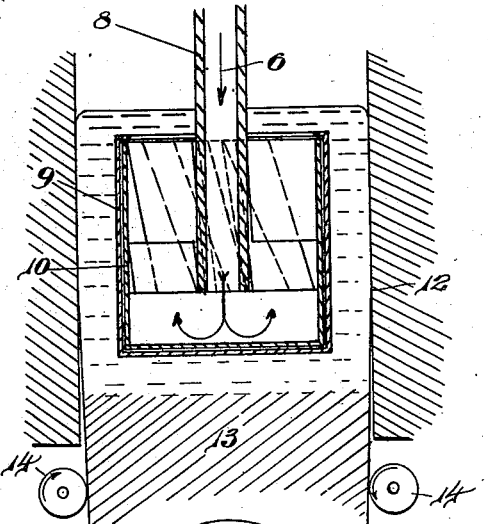
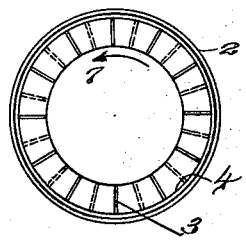
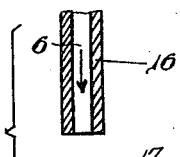
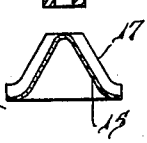
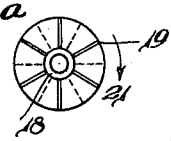
Inventor:
Siegfried Junghans
by Emery, Varney, Whittemore, Dix
Attorneys.

Dec. 17, 1940.    S. JUNGHANS    2,225,414
METHOD OF TREATING MOLTEN SUBSTANCES, SUCH AS METALS
Filed March 31, 1938    3 Sheets-Sheet 2

Dec. 17, 1940.  S. JUNGHANS  2,225,414
METHOD OF TREATING MOLTEN SUBSTANCES, SUCH AS METALS
Filed March 31, 1938  3 Sheets-Sheet 3
*Fig. 9*
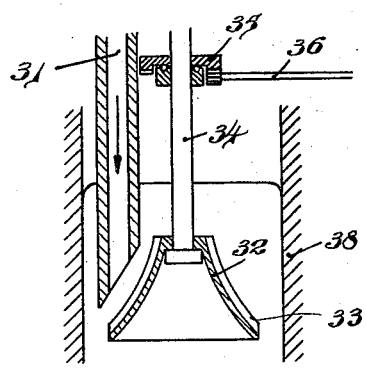
*Fig. 9a*
*Fig. 10*
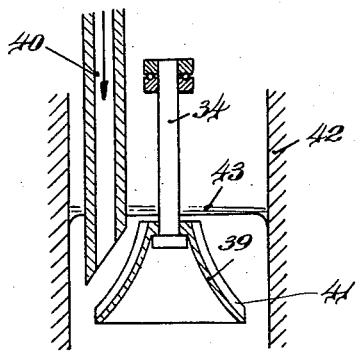
*Fig. 10a*
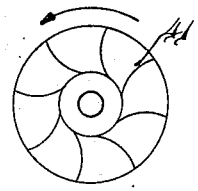
Inventor:
Siegfried Junghans
by Emory, Varney, Whittemore & Dix
Attorneys.

Patented Dec. 17, 1940

2,225,414

UNITED STATES PATENT OFFICE 2,225,414

METHOD OF TREATING MOLTEN SUBSTANCES, SUCH AS METALS

Siegfried Junghans, Stuttgart, Wurttemberg, Germany

Application March 31, 1938, Serial No. 199,168
In Germany April 1, 1937

5 Claims. (Cl. 22—57.2)

In the treatment of substances, and more particularly metals, in the molten condition it has been found desirable to perform this treatment on such lines that merely comparatively small quantities of the substance or metal concerned are subjected to the said treatment at one time. The treatment in question, which is carried out in a continuous operation, refers more particularly to the treatment of a molten substance by gases or to the production of alloys. It will be readily appreciated that in this manner by the progressive treatment of small quantities a more even treatment of a large amount can be brought about than in the manner hitherto usual, in which the total amount has been treated in one operation.

In this method the procedure is such that for example in a mold of suitable design merely a small quantity of the substance or metal to be treated in the molten condition is maintained in such condition by suitable regulation of the temperature, whilst the remaining amount, for example in the case of metals, has already solidified. The molten substance subsequently added can be introduced in desired fashion, but preferably by means of a suitable conduit or the like. In this connection it is necessary in order to avoid turbulence upon the introduction of the substance to provide means so that the additional substance does not pass to the gradually solidifying substance direct, but is first supplied to an intercepting member, such as a plate, pot or the like, which brings about a variation in the direction, and thus conveys the fresh material to the gradually solidifying substance in gentle movement.

Upon this deflection it is also accomplished at the same time that any irregularities in the added substance resulting from the treatment by the gases or in the composition are eliminated by the mixing action taking place.

It has been found that in numerous cases a simple baffle plate, pot or the like is not sufficient to cause complete homogeneity of the fresh substance added when the latter enters into contact with the gradually solidifying substance.

To overcome this drawback the interception member according to the invention causes not only a variation in the direction but also a rotation of the freshly added substance in order in this way to obtain a good homogeneity. The intercepting member or a part of the same may have a rotary motion imparted thereto either by the kinetic energy of the inflowing material or by mechanical means.

It is also possible to provide the intercepting member, pot or the like with a centrifugal action, and to furnish the same with vanes or the like, so that the substance flowing from a nozzle has a variation in its direction imparted thereto by reason of the rotating vanes and is deflected towards the walls of the mold, from where it passes into the mold itself. In this way a good homogeneity of the product is obtained. At the same time, by the aid of a suitable circumferential velocity, it can also be accomplished that the molten substance is flung by the vaned head against the walls of the surrounding mold, and if provision is made for a suitable cooling of these walls, so that the substance solidifies in contact with the same, a chilled casting is naturally obtained.

Certain embodiments of the invention are illustrated by way of example in the accompanying drawings.

Fig. 1 shows in longitudinal section an embodiment of the intercepting member with eccentric inflow of the molten material.

Fig. 1A is a cross section of the intercepting member of Fig. 1.

Fig. 2 shows in longitudinal section a modified form of embodiment in which the molten substance is introduced centrally.

Fig. 2a is a cross section of the intercepting member according to Fig. 2.

Figs. 3 and 4 are longitudinal sections of modified forms of the invention.

Figs. 3a and 4a are plan views of the rotatable members illustrated in Figs. 3 and 4, respectively.

Figs. 9 and 9a illustrate embodiments in longitudinal section and in plan respectively of the rotating element in which the intercepting member is designed as a motor-driven turbine.

Figs. 10 and 10a are a longitudinal section and plan respectively of the rotating part of an interception member similar to that in Figs. 9 and 9a, but in which the operation is brought about by the inflowing substance.

Figure 5:
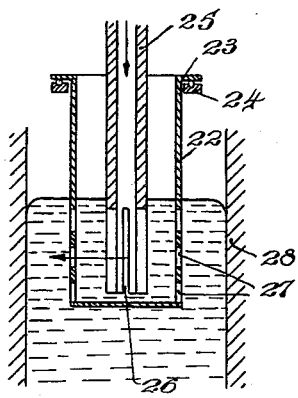
Figs. 5 and 5a show in longitudinal section and in cross-section an embodiment of the interception member, in which the latter is constructed as a rotating pot.

In the embodiment according to Figs. 1 and 1a there is provided within the mold 1 a pot 2, in which there is mounted an additional pot 4 furnished about its inner periphery with vanes 3.

Eccentrically to the pot 4 there is provided the conduit 5 through which the molten substance is introduced in the direction of the arrow 6 at a certain speed which will depend upon the nature of the substance and the rate at which it solidifies. Owing to the inflow of the substance into the pot 4 the latter is set into rotation in the direction of the arrow 7 by the action of the substance on the obliquely disposed vanes 3 (see Fig. 1a). The rotation thus brought about causes the substance to be well agitated, so that the further substances added, such as other metals or gases, are caused to be intimately mixed with the basic substance within the comparatively small quantity contained in the pots 4 and 2. The molten substance thus treated then passes over the edge of the pot 2 into the mold in a steady flow without producing turbulence, so that the solidifying action is not impaired.

The embodiment according to Figs. 2 and 2a operates on similar lines. In this case the substance is supplied centrally instead of eccentrically, the conduit 8 for the molten substance being disposed in the central axis of the co-axially arranged pots 9 and 10 and being extended with its orifice almost to the bottom of the pot 10, which carries at its upper end the vanes 11, so that the upwardly flowing substance causes the pot 10 to rotate and thus brings about the agitation essential for proper mixing. Fig. 2, moreover, shows schematically how the casting that has been produced is drawn continuously out of the mold 12. The molten metal introduced into it through the cup is still fluid in the upper part, but solidifies as it moves downward. On emerging from the mold 12 it has already solidified. This solidified part 13 is gripped by the conveyor rollers, and drawn downward. This conveyor mechanism is, of course, used in all forms of the invention.

In the embodiment according to Figs. 3 and 3a there is provided in place of a pot an intercepting member 15, which likewise prevents the substance from passing into the mold direct through the conduit 16 and thus causing a turbulence in the substance already in the mold.

The intercepting member 15 is furnished with curved vanes 17, so that it is set into rotation by the inflow of the substance.

At the same time the substance entering vertically is deflected in a more or less horizontal direction, and at the same time is agitated and well mixed with any other substances which may be added, and at the same time the substance is prevented from causing turbulence in the mold itself. Owing to the rotation of the member 15 the molten substance is to a certain extent flung against the walls of the mold, so that also in this manner a good mixing with other substances which may have been added is brought about.

The operation is also similar in the embodiment according to Figs. 4 and 4a, in which the intercepting member 18 is furnished with obliquely disposed vanes 19 and the feed conduit 20, as in Fig. 1, is disposed eccentrically. The rotation takes place in the direction of the arrow 21.

Figure 5A:
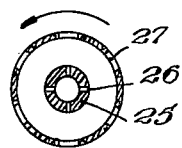

Figs. 5 and 5a show in longitudinal section and in cross-section respectively a pot-like intercepting member 22, which is furnished at the upper end with an annular flange 23 running in a ball bearing 24. In this ball bearing the pot 22 can be set into rapid rotation by any desired means. The substance flows into the pot through the conduit 25 and enters the pot through longitudinal slots 26. The molten substance is caught up by the rotating pot 22 and flung through the slots vertically against the wall 28 of the mold.

Figure 7:
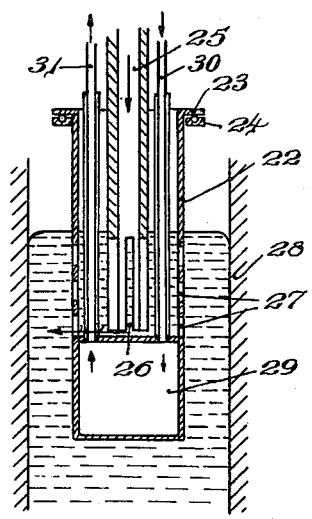
Figs. 7 and 8 show an embodiment similar to Figs. 5 and 6, with the difference that the lower part of the pot is capable of being cooled.

According to Fig. 7, this device may also be furnished with a cooled portion 29, to which a desired cooling agent can be fed through the pipe 30. The consumed cooling agent is discharged through the pipe 31. Apart from this the arrangement of the pot is exactly as described in conjunction with Figs. 5 and 5a and similar reference numerals are applied to corresponding parts.

Figure 6:
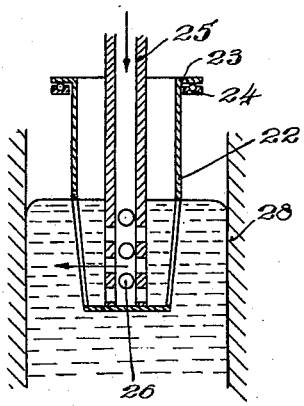
Figs. 6 and 6a show similar arrangements.
Figure 6A:
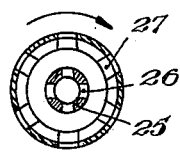

Figs. 6 and 6a show an embodiment of the pot, in which the sole difference as compared with Fig. 5 consists in the fact that the molten substance is introduced into the pot from the conduit 25 not through longitudinal slots (Fig. 5), but through perforations 26.

Figure 8:
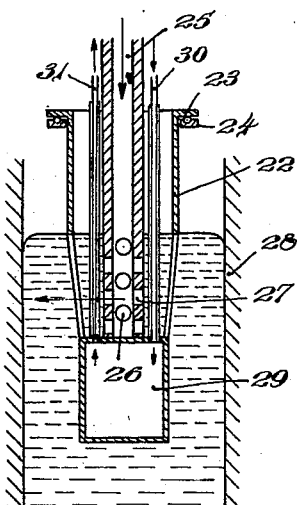

The embodiment according to Fig. 8 corresponds to that in Fig. 6 with the difference that the pot 22 in this embodiment is furnished with cooling means 29, which may be supplied and discharged through the medium of pipes 30 and 31, as in the embodiment according to Fig. 7.

Figs. 9 and 9a show an additional embodiment for the production of chilled castings. In this case the intercepting member 32 consists of a turbine, which is furnished with blades 33 (Fig. 9a), and which is driven by the shaft 36 by way of the shaft 34 and transmission 35. The molten substance, for example molten metal, is supplied in the usual fashion through the pipe 37 on the periphery of the turbine. When the substance impinges on the intercepting member, there occurs a variation in the direction, and the metal is flung against the cooled walls 38 of the mold.

A similar embodiment is illustrated in Figs. 10 and 10a, the difference as compared with that in Figs. 9 and 9a consisting solely in the fact that in this case the mechanical drive 35, 36 in Fig. 9 is dispensed with. The intercepting member 39 is set into motion solely by the molten substance entering by way of the conduit 40, this substance impinging on the plates 41 of the turbine (Fig. 10a) and causing the turbine to rotate. In this case the substance is also flung against the cooled wall 42.

In the embodiment according to Fig. 10 the molten substance is protected at the top against the atmosphere by a covering means 43, which may consist, for example, of a liquid salt, oil, water or the like.

With the forms of construction according to Figs. 3 to 10a it is possible to operate in two different ways. On the one hand the cup or the bladed wheel may be caused to rotate above the surface of the fluid metal in the mold, so that the molten metal is thrown against the walls of the mold. Tubing is thus produced in continuous centrifugal casting.

On the other hand however, the cup or the bladed wheel may be kept below the surface of the molten metal poured into the mold. In this case also a centrifugal action is obtained, this action however acts to densify the metal at the inner surface of the mold.

What I claim as new and desire to secure by Letters Patent is:

1. Device for the continuous casting of molten materials, comprising a casting mold, a rotating cup immersed in the molten material in the mold below the surface of the molten material, said cup having vanes adapted to stir the molten material and to divert the molten metal away from the point of solidification as it enters said casting mold, and an inflow channel for the molten material, which is disposed eccentrically relatively to the cup.

2. Device for the continuous casting of molten materials, comprising a casting mold, an inflow channel for the molten material, a rotating cup immersed in the molten material in the mold below the surface of the molten material, said cup being adapted to stir the molten material and to divert molten material away from the point of solidification as it enters said casting mold, and a second stationary cup which surrounds said first cup.

3. Process for the continuous casting of molten materials for producing castings, consisting of introducing molten material into an open ended casting mould, maintaining a head of molten metal in the upper end of said mould, said metal being poured into an intercepting element immersed in the molten metal head below the surface thereof, and simultaneously imparting to said intercepting element a rotary motion relative to said mould whereby said head of molten metal is stirred and mixed to maintain uniform conditions above the point of solidification.

4. Apparatus for the continuous casting of molten materials for producing castings comprising, an open ended casting mould, an inflow channel for molten materials, means immersed in the molten material in the mould below the surface of the molten material and disposed in the path of the material flowing from said channel adapted to stir the molten material in the mould and to divert said flow away from the point of solidification, said means being mounted for rotation relative to said mould.

5. Apparatus for the continuous casting of molten materials for producing castings comprising, an open ended casting mould, an inflow channel for molten material, means immersed in the molten material in the mould below the surface of the molten material and disposed in the path of the material flowing from said channel adapted to stir the molten material in the mould and to divert said flow away from the point of solidification, said means being mounted for rotation relative to the said mould, and vanes on said means adapted to engage the inflowing material.

SIEGFRIED JUNGHANS.